(12) United States Patent
Weber

(10) Patent No.: US 7,979,599 B2
(45) Date of Patent: Jul. 12, 2011

(54) METHOD FOR THE ALLOCATION OF MEMORY IN A BUFFER MEMORY

(75) Inventor: Karl Weber, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 148 days.

(21) Appl. No.: 12/473,367

(22) Filed: May 28, 2009

(65) Prior Publication Data
US 2009/0300235 A1    Dec. 3, 2009

(30) Foreign Application Priority Data

May 28, 2008   (EP) .................................... 08009727

(51) Int. Cl.
G06F 3/00       (2006.01)
G06F 13/00      (2006.01)
(52) U.S. Cl. ................... 710/15; 710/8; 710/36; 710/52
(58) Field of Classification Search ........................ None
See application file for complete search history.

(56) References Cited

U.S. PATENT DOCUMENTS
2005/0055406 A1*   3/2005   Singhai et al. ................ 709/206

FOREIGN PATENT DOCUMENTS
DE       10048747 A1     5/2002
EP        0843843 B1    11/1999
WO    WO 2008008662 A2   1/2008

OTHER PUBLICATIONS

O'Kane, Stephan, Design and Implementation of a Shared Buffer Architecture For Fixed and Variable Sized Packets, 2005, ieee.org [online, accessed on Dec. 17, 2010], URL: http://ieeexplore.ieee.org/stamp/stamp.jsp?tp=&arnumber=1517654.*

* cited by examiner

Primary Examiner — Tariq Hafiz
Assistant Examiner — Scott Sun

(57) ABSTRACT

A method for allocation of a buffer memory with three buffers of a module having a processing unit and a bus connection is provided. The module sends or receives data via the bus connection and uses the processing unit to generate data for transmission via the bus connection and process data received via the bus connection. The bus connection and the processing unit function as a producer or consumer in a communication relationship established via the buffer memory. Each buffer assumes one of four statuses—"input area local", "local", "input area external" and "external". Either the bus connection or the processing unit attempt to reserve one of the three buffers by a strategy: when one of the three buffers is already allocated, this buffer is used. Otherwise a buffer with the status "input area external" or "input area local" is used and the status "external" or "local" is assigned.

16 Claims, 4 Drawing Sheets

METHOD FOR THE ALLOCATION OF MEMORY IN A BUFFER MEMORY

CROSS REFERENCE TO RELATED APPLICATIONS

This application claims priority of European Patent Application No. 08009727.2 EP filed May 28, 2008, which is incorporated by reference herein in its entirety.

FIELD OF INVENTION

The present invention relates to a method for allocation of a buffer memory of a module comprising at least three buffers, in particular a module intended for use in the automation of industrial processes, with a processing unit and a bus connection. A module of this kind is provided for the control and/or monitoring of industrial processes for the data exchange between the applications used thereby and the communication infrastructure. A data exchange of this kind requires the provision of resources that permit rapid and consistent access without the application being blocked. In the following, a processing unit provided on the module is described as an application, which is, for example, a processor or provides the functionality of a processor and is correspondingly intended and suitable for the execution of an application, i.e. an automation solution.

The module is preferably a so-called distributed interface module since in automation technology increased use is being made of distributed systems which are communicatively connected to each other by means of the relevant communication infrastructure, that is, for example, a bus, in particular a field bus. Input signals from the relevant industrial process are read in by the distributed interface modules in a known manner and processed or preprocessed locally and at least partially transmitted to a higher-level unit, for example, a central processing unit in a programmable control system, a master computer or the like. The higher-level unit then processes the received input signals and from the input signals, possibly using further internal values in the central unit, determines output signals, which are then transmitted again via the communication infrastructure to individual or all distributed interface modules. The industrial process is then influenced in that all or individual interface modules output the output signals received in this way to the relevant industrial process and hence influence actuators in the process for example, motors, valves, etc.

BACKGROUND OF INVENTION

The reading-in of the input signals by the industrial process and the outputting of the output signals to the industrial process are performed in an interface module by means of the processing unit comprised therein within a so-called cycle time. This cycle time is normally very different from the time between two access periods of the higher-level unit to the relevant interface module. The input and output signals can, therefore, not be forwarded or processed immediately, but have to be temporarily stored in the interface module. A buffer circuit for this is known from the EP 0 843 843 B1 with which a processing unit of the interface module described therein on the one hand and a bus connection on the other in a buffer memory reserve one of three memory areas (buffers), so that it is guaranteed at all times that the processing unit and bus connection have access to a buffer in the buffer memory into which new data can be written without overwriting data written immediately prior thereto. However, it has been found that there is a requirement to improve the flexibility of a fixed relationship of two buffers in each case with the two communication entities, that is the processing unit on the one hand and the bus connection on the other, associated with the approach in the aforementioned EP 0 843 843 B1.

SUMMARY OF INVENTION

An object of the present invention is to propose a method for the allocation of a buffer memory of a module with a processing unit and a bus connection comprising at least three buffers, in which the reservation of one of the three buffers in each case facilitates improved flexibility.

This object is achieved with a method as claimed in the independent claim. It is provided a method for the allocation of a buffer memory of a module comprising at least three buffers with a processing unit and a bus connection, wherein the module sends or receives data via the bus connection and uses the processing unit to generate data for transmission via the bus connection and process data received via the bus connection, therefore the bus connection, on the one hand, and the processing unit, on the other, function as a producer or consumer in a communication relationship established via the buffer memory, that each buffer can assume one of four statuses, namely "input area local", "local", "input area external" and "external" and that either the bus connection or the processing unit—hereinafter each also referred to as the "unit"—attempt to reserve one of the three buffers by means of the following strategy: if one of the three buffers is already allocated, this buffer is used, otherwise one of the buffers with the status "input area external" (in the case of reservation by the bus connection) or "input area local" (in the case of reservation by the processing unit) is used and for this the relevant buffer is assigned the status "external" or "local". Hereby,—unlike the situation in EP 0 843 843 B1, in which one of the buffers is always assigned to the bus connection and a further buffer to the processing unit—it may also happen that temporarily no buffer is assigned to the bus connection or the processing unit or even to the bus connection and the processing unit.

The statuses "local" and "external" correspond, without a status management of this kind being addressed in EP 0 843 843 B1, approximately to the reservation strategy pursued in the aforementioned prior art. There, as soon as either the processing unit or the bus connection reserves one of the buffers of the buffer memory there, they can be recognized as having assumed a status of this kind. The non-reserved buffer memory has an intermediate status, which, for example, could be described as "free". This means that status transitions from "local" or "external" to "free" and from "free" to "local" or "external" are possible.

According to the invention, additional statuses are used and the processing unit and bus connection each reserve one of the buffers of the buffer memory only when required, while in EP 0 843 843 B1 the processing unit and bus connection always reserve one of the three buffers. The buffer memory is used cyclically in principle in such a way that initially, for example, the processing unit uses the relevant buffer, this is then used by the bus connection and then again by the processing unit, and so on. Before either the processing unit or bus connection come to reserve a buffer, it may happen that one or more buffers become free for use by either the processing unit or the bus connection. Such buffers are so-to-speak assigned to an "input area" of the relevant unit and since obviously it is not possible for the spatial arrangement to change, this will be identified by a corresponding status, which is "input area local" or "input area external". The relevant unit can "make use" of the relevant input area. Only if no buffer is assigned to the relevant input area by means of a corresponding status assignment is it necessary to apply exception handling, for example in such a way that, a buffer from the input area of the complementary unit, that is a buffer which has not yet been utilized or processed by this, will be reserved again and hence so-to-speak recovered.

The described method which is further explained below is preferably implemented in software. Correspondingly, the invention also relates to a computer program for the execution of a method of this kind, the computer program instructions for the implementation of the individual method steps or method step sequences, a data medium with a computer program of this kind and a computer system on which a computer program of this kind is loaded, that is, for example, a module of the type described in the introduction, in particular a so-called distributed interface module, or a buffer memory included in the module with a buffer memory arbitration logic, the functionality of which is described here and below.

Advantageous embodiments of the invention are the subject matter of the dependent claims. The back-references used hereby point to the further development of the subject matter of the main claim by virtue of the features of the relevant dependent claim; they are not to be understood as a waiver of the attainment of an independent, objective protection for the feature combinations of the dependent claims to which they refer. Furthermore, with regard to an interpretation of the claims in the case of a more detailed concretization of a feature in a subordinate claim, it is to be assumed that a restriction of said kind is not present in the respective preceding claims.

It has been found that it is sufficient if exactly one buffer can assume the status "local", exactly one buffer the status "external" and a maximum of three buffers the status "input area local" and similarly a maximum of three buffers the status "input area external". A solution of this kind can also be used without adapting the hardware described in EP 0 843 843 B1, that is with the three buffers already provided there, and insofar can be used seamlessly with existing automation solutions with the existing communication infrastructure and the peripheral devices used therewith.

Following the reservation of one of the three buffers by either the bus connection or the processing unit, the relevant buffer is assigned the status "input area local", in the case of an "external" reservation by the bus connection or "input area external", in the case of a "local" reservation by the processing unit, and hence forwarding to the input area of the complementary unit is achieved.

Preferably, when using a buffer with the status "input area external" or "input area local", in the case of a plurality of usable buffers with this status, the buffer which has held this status for the longest is used. In this way, it is guaranteed that data which are forwarded in the relevant buffers from one unit to the other is processed in accordance with the time of its receipt or its generation.

With respect to the "recovery" of buffers already mentioned above, it is advantageously provided, if no buffer with the status "input area external" is available for the bus connection and no buffer with the status "input area local" is available for the processing unit, that the bus connection or the processing unit reserve a buffer with the status "input area local" or "input area external" and to be precise the buffer which has held this for shortest time. This ensures that a buffer can be made available at least for the producer or the consumer, wherein the repeat use of an already used buffer is particularly strongly justifiable in that the last buffer used, that is the buffer which has held the relevant status for the shortest time, is recovered/used again.

In order to identify which buffer has held a specific status for the longest time, for the management of the maximum three buffers with the status "input area local" or "input area external", a data structure is provided with which a duration of this kind may be encoded by a position in the data structure. Examples of data structures of this kind are fields, that is, for example, static data structures in the type of a so-called "array" or dynamic data structures in the type of a list, in particular singly or doubly linked lists. Similarly to the prioritization of the use of a buffer in accordance with a duration during which the relevant buffer holds a specific status, it is provided that, following the reservation of a buffer by either the bus interface or the processing unit, the relevant buffer is assigned the status "input area local" or "input area external" and entered in the data structure at a last free position so here again there is a correlation between the duration of the relevant status and the position in the data structure. Alternatively, it is also possible to expand the four above-described statuses to, for example, eight statuses, wherein the increase in the number of statuses results from a finer formulation of the two basic statuses "input area local" and "input area external", for example, as "input area local 1", "input area local 2", "input area local 3" and "input area external 1", "input area external 2" and "input area external 3". In the case of more than three buffers, the result would then be—on the basis of the four basic statuses always present—a correspondingly higher number of individual statuses. With a finer formulation of the basic statuses of this kind, it is possible to dispense with a data structure to use for the encoding of the duration of a specific status (as described above), and, for example, to assign the buffer, which is assigned "input area local" for the longest time, the status "input area local 3", while a status "input area local 2" identifies a buffer, which is assigned "input area local" for the second longest time, etc. It is irrelevant and makes no difference overall whether the assignment provided takes place in that the buffers are assigned one of the statuses (basic status or finer formulation of a basic status) or in that the statuses are assigned a buffer.

BRIEF DESCRIPTION OF THE DRAWINGS

The following describes an example of an exemplary embodiment of the invention in more detail with reference to the drawing. Equivalent objects or elements have been given the same reference numbers in all the figures.

The or each exemplary embodiment should not be understood as a limitation of the invention. On the contrary, numerous changes and modifications to the present disclosure are possible, in particular such variants and combinations, which, for example, by the combination or modification of individual features or elements or method steps in conjunction with those described in the general or specific descriptive part and contained in the claims and/or the drawing may be derived by the person skilled in the art with respect to the achievement of the object and by means of combinable features result in a new subject matter or new method steps or method step sequences.

The drawings show

Figure 1:
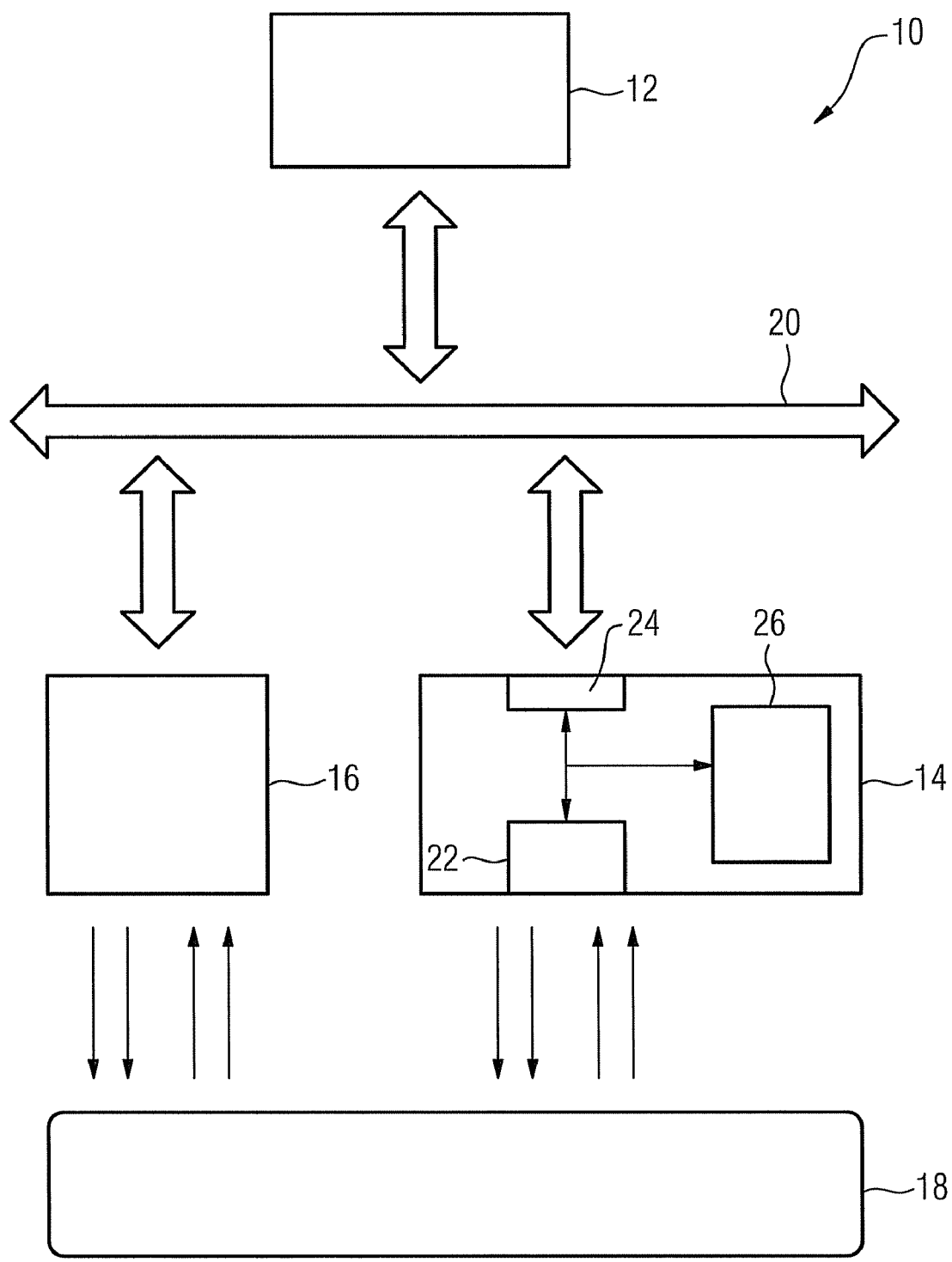
Figure 2:
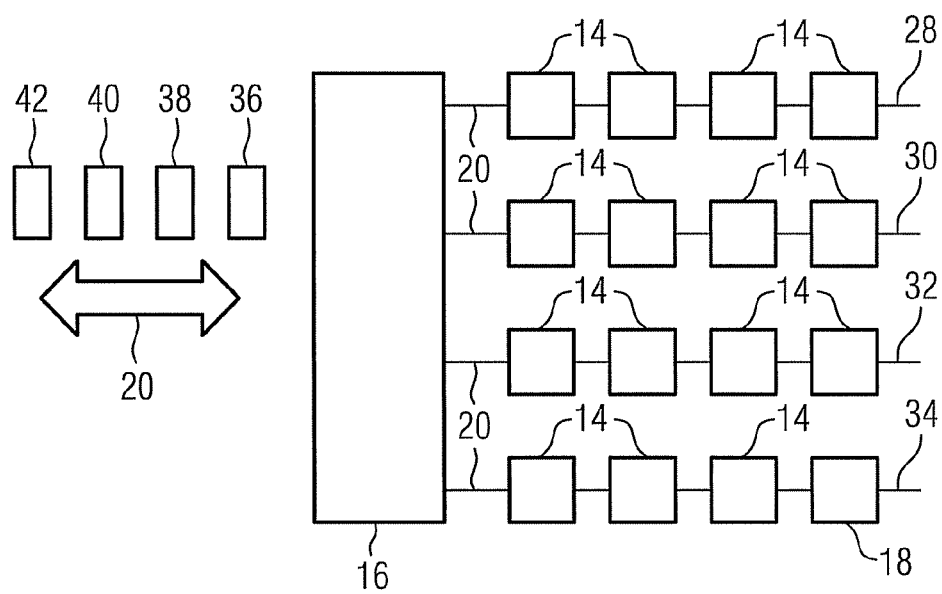
Figure 3:
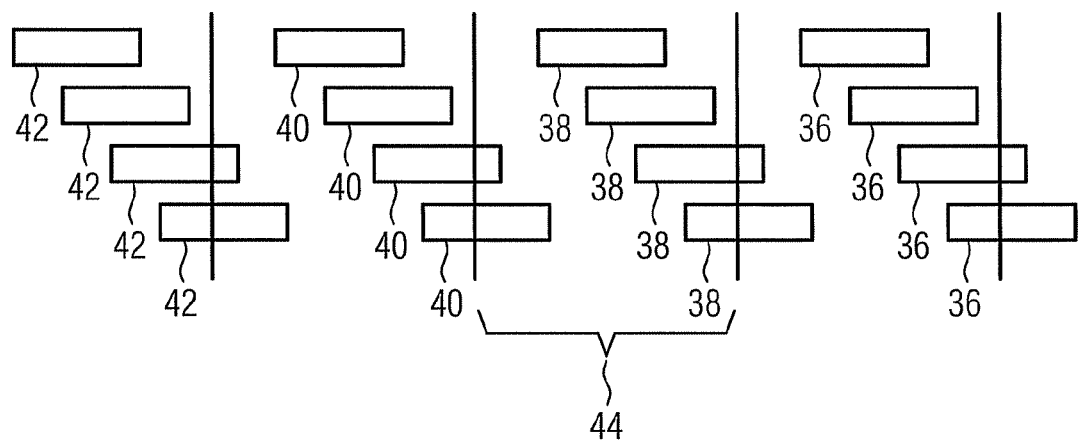
Figure 4:
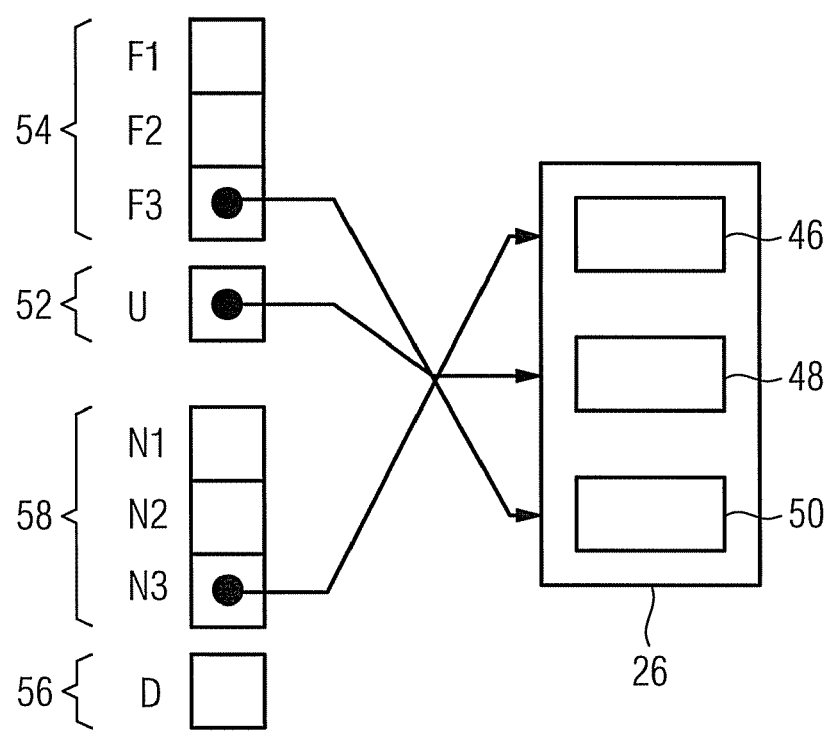
Figure 5:
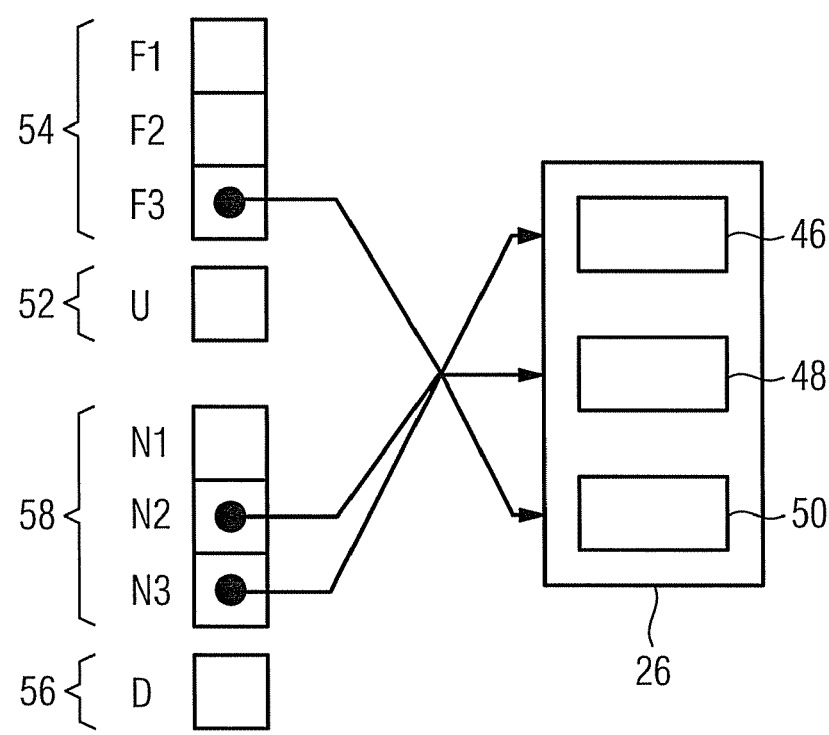
Figure 6:
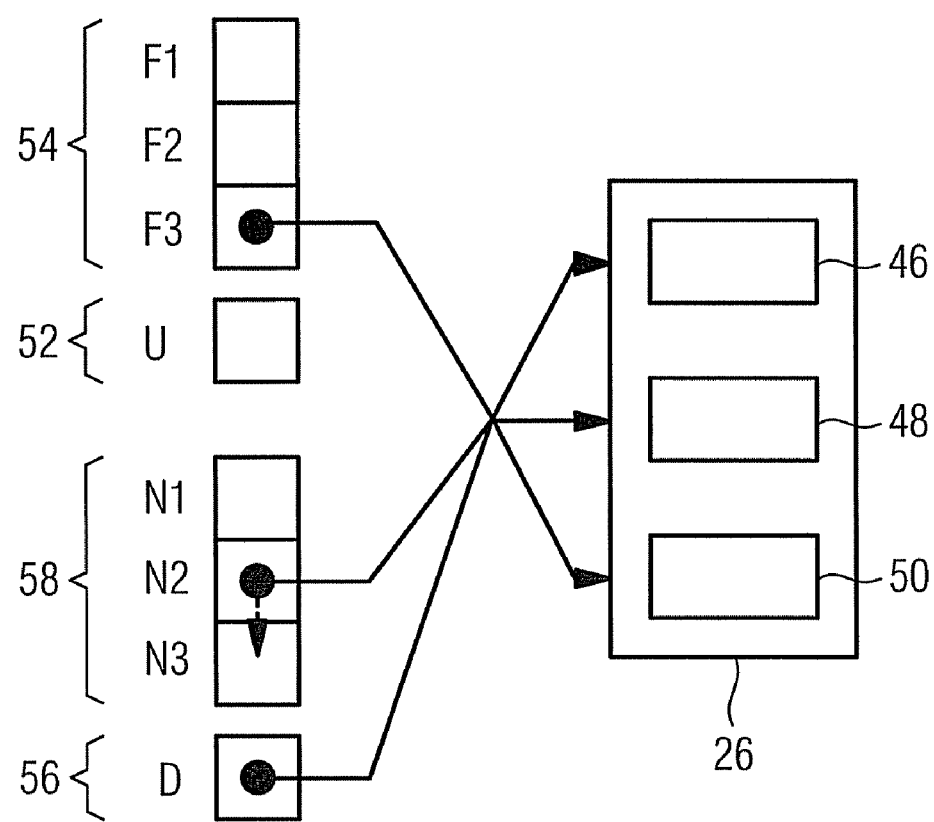

FIG. 1 a schematically simplified representation of an automation system for controlling an industrial process with distributed peripheral devices comprised in the automation system, which as assignable resources for data exchange in the automation system comprise a buffer memory with a plurality of buffers formed therein, FIG. 2 a detail of the automation system with a plurality of peripheral devices attached to a peripheral device functioning as a switch, FIG. 3 a time difference resulting with a finite forwarding time in a switch, as shown in FIG. 2, during the forwarding of data in the automation system, FIG. 4 the buffer memory with the buffers formed therein and a diagrammatic view of their reservation and use and FIG. 5-6 Momentary snapshots of the use of the buffer memory.

DETAILED DESCRIPTION OF INVENTION

FIG. 1 shows an automation system, designated 10 overall and only depicted schematically, comprising a higher-level unit 12, that is, for example, a central processing unit of a programmable control system, and one or more, peripheral devices 14, 16 otherwise also referred to as a module. The automation system 10 is provided to control and/or monitor an industrial process 18 not shown in any more detail. For this, in particular the peripheral devices 14-16 exchange data with the industrial process 18, for example, in that, in a known way, sensor signals from sensors provided in the industrial process 18, as, for example, position switches, measuring sensors, etc, are received as input signals and output signals are sent to actuators in the industrial process 18, that is, for example, motors, valves, etc.

The units of the automation system 10, that is one or more higher-level units 12 and the or each peripheral device 14-16, are connected communicatively via a communication infrastructure provided therefore, for example, a bus, in particular a so-called field bus 20, which here is only shown in a schematically greatly simplified depiction with respect to the possible data flow.

Only one of the peripheral devices 14-16 is depicted in further detail. In principle, all the peripheral devices 14-16 have the same or at least a comparable construction if they are provided to participate in the method according to the invention. The automation system 10 can therefore quite possibly also comprise peripheral devices in which the data exchange is executed, for example, according to the approach described in EP 0 843 843 B1. FIG. 1 shows a processing unit 22, a bus connection 24 and a buffer memory 26 as details of a peripheral device 14-16.

FIG. 2 shows a schematically simplified detail of the automation system 10 according to FIG. 1, wherein in particular it depicts that an automation system of this kind usually comprises a plurality of peripheral devices 14. FIG. 2 specifically shows that the automation system 10 comprises at least one peripheral device 16 functioning as a switch or router to which a plurality of interface modules 14 is connected in four lines 28, 30, 32, 34 belonging to the field bus 20. A schematically simplified depiction on the input side of the peripheral device 16 functioning as a switch shows that data are transferred via the field bus 20 in packets; in FIG. 2, this is illustrated by four so-called frames 36, 38, 40, 42. For the distribution of the data comprised thereby in the automation system 10 (FIG. 1), the frames 36-42 are transmitted by the peripheral device 16 functioning as a switch in finite time one after the other into the individual lines 28-34 and received by the peripheral devices 14 connected thereto.

FIG. 3 shows a momentary snapshot of this with the transmission of the frames 36-42 into the lines 28-34 (FIG. 2), wherein the line-type arrangement of the frames 36-42 in FIG. 3 is intended to correspond to the lines 28-34 depicted in FIG. 2. The vertical lines plotted are intended to illustrate the start and the end of a cycle time 44 of an automation solution, executed, for example, by the higher-level unit 12 (FIG. 1). Hereby, FIG. 3 shows that, since the peripheral device 16 functioning as a switch can only forward the frames 36-42 in finite time into the individual lines 28-34, this results in a time delay with respect to the availability of data comprised by the frames 26-42 in the individual peripheral devices 14. This may have the result that individual peripheral devices 14 have already received a frame 36-42, which other peripheral devices 14 only receive in a subsequent bus cycle 44. This has the result that synchronicity of the data present in the peripheral devices 14 or the data supplied by the peripheral devices 14 cannot be guaranteed. One way of avoiding this effect is to extend the cycle time 44 in such a way that it is possible to ensure for all connected peripheral devices 14 that the data comprised by one frame 36-42 can be received completely during the same bus cycle 44. However, this is disadvantageously linked to a, under some circumstances significant, prolongation of the bus cycle, which, for example, can have the result during control processes that only a reduced number of actual values can be received and this once again has a negative impact on the accuracy of the control process. The invention now makes it possible that, with all interface modules, the incoming data as a result of received frames 36-42 are stored temporarily so that they can be processed synchronously, without, for example, data that have not yet been evaluated being overwritten by more recent data and hence a measured value, which although it is old, still describes the dynamics of a control process failing to be evaluated.

FIG. 4 shows the buffer memory 26 comprised by a peripheral device 14-16 (FIG. 1) with at least three buffers 46, 48, 50 formed therein. The buffers 46-50 are available for reservation by either the bus connection 24 or the processing unit 22. The processing unit 22 is referred to below as "module local" and correspondingly statuses, which identify one of the buffers 46-50 as used by the processing unit 22 or as usable for the processing unit 22, are referred to as "local" or "input area local" and for this referred to by reference numbers 52 and 54 in the diagrams. On the other hand, when either external data are received or data are transmitted externally, the bus connection 24 is described as "module external" for differentiation and statuses which identify the individual buffer memory 46-50 as used by the bus connection 24 or usable for the bus connection 24, are referred to a "external" or "input area external" and for this referred to by reference numbers 52 and 54 in the diagrams.

FIG. 4 shows a possible configuration in which the processing unit 22 has reserved a buffer 46-50 (status: "local" 52), a further buffer 46-50 can be used for the processing unit 22 (status: "input area local" 54) and a further buffer 46-50 can be used for the bus connection 24 (status: "input area external" 58). It is in principle of no importance which of the three buffers 46-50 is used in each case, but obviously exclusive use of a buffer 46-50 is essential in each case.

As soon as, for example, the processing unit 22 gives up the reservation of the buffer 46-50 used, the relevant buffer changes its status from the previous status "local" 52 to the new status "input area external" 58, therefore the buffer so-to-speak migrates into the "sphere of influence" of the bus interface 24. If the bus interface 24 (based on the depiction in FIG. 4) has not reserved the buffer 46-50 already marked there for use by the bus interface 24, after this step, two buffers 46-50 are available for the bus interface 24. FIG. 5 shows the resultant configuration.

At a specific time, the bus connection 24 will reserve one of the buffers 46-50 and for this, selects a buffer 46-50 which is assigned the status "input area external" 58. For this selection, normally preference is given to the buffer which has held this status for the longest time. In exceptional cases, for example, if the "input area external" is empty, that is none of the buffers has a status identifying it as belonging to the "input area external", the last buffer entered in the input area will be chosen. Most simple is the encoding of the duration for which a buffer 46-50 holds a specific status and a selection based thereon if a data structure is used to manage the relevant statuses with which aspects of this kind can be encoded, that is, for example, a field, a list or the like, wherein FIG. 4 and FIG. 5 already attempt to depict graphically the field aspect of a data structure of this kind for the "input area local" 54 and "input area external" 58 or by means of a finer formulation these two basic statuses, wherein the graphical depiction can also be conceived as a finer formulation of this kind.

After the selection of one buffer 46-50 from a plurality of available buffers 46-50, that is either from the "input area local" 54 or "input area external" 58 corresponding to a duration for which the selected buffer 46-50 holds the relevant status, first, in the data structure the position encoding the maximum duration becomes free so that subsequently, for the correct acceptance of further buffers 46-50, if these change their status, the previous buffers 46-50 with this status are displaced toward the position which encodes the maximum duration (see FIG. 6; see there, in particular the broken vertical arrow).

For simple reference, the individual statuses are designated "F", "U", "N" and "D" and positions in data structures retained therefore with "1", "2" and "3".

Transferred to the situation depicted in FIG. 3, this means that for data that are not completely received in one bus cycle 44, an additional buffer 46-50 assumes the status "input area local" 54 or "input area external" 58. Even if the data have still not been read or written ("local" 52 or "external" 56), for the input or output side, that is the processing unit 22 or bus connection 24, there is always a buffer 46-50 available to which the status "input area local" 54 or "input area external" 58 can be assigned. If it is not yet possible to process the data contained in the relevant buffer 46-50, it is also possible for several buffers 46-50 to be assigned to the incoming or outgoing input area ("input area local" 54 or "input area external" 58) and, to be precise, in extreme cases, all the buffers 46-50 comprising the buffer memory 26, that is three buffers 46-50.

Hence, the invention may be summarized as follows: A method for the allocation of a buffer memory 26 of a module 14-16 comprising at least three buffers 46, 48, 50 with a processing unit 22 and a bus connection 24, wherein the module 14-16 sends or receives data via the bus connection 24 and uses the processing unit 22 to generate data for transmission via the bus connection 24 and process data received via the bus connection 24, therefore the bus connection 24 on the one hand and the processing unit 22 on the other function as a producer or consumer in a communication relationship established via the buffer memory 26, wherein each buffer 46, 48, 50 can assume one of four statuses—"input area local" 54, "local" 52, "input area external" 58 and "external" 56, wherein either the bus connection 24 or the processing unit 22 attempt to reserve one of the three buffers 28-30 by means of the following strategy: if one of the three buffers 28-30 is already allocated, this buffer 28-30 is used, otherwise one of the buffers 28-30 with the status "input area external" 58 or "input area local" 54 is used and for this the relevant buffer 28-30 assigned the status "external" 56 or "local" 52.

The invention claimed is:

1. A method of allocation of a buffer memory with three buffers of a module having a processing unit and a bus connection, comprising:

sending or receiving data by the module via the bus connection;

generating and processing data for transmission via the bus connection by the module using the processing unit, wherein the bus connection and the processing unit function as producer or consumer in a communication relationship established via the buffer memory;

using by each buffer one of four statutes "input area local", "local", "input area external" and "external", wherein the statutes "input area local" and "local" are used by the processing unit, and wherein the statutes "input area external" and "external" are used by the bus connection; and allocating one of the three buffers by the bus connection or the processing unit, wherein, when one of the three buffers is already allocated, the already allocated buffer is used, otherwise, one of the buffers with the status "input area external" or "input area local" is used and the status "external" or "local" is assigned.

2. The method as claimed in claim 1, wherein exactly one buffer uses the status "local", exactly one buffer uses the status "external" and a maximum of three buffers uses the status "input area local" and a maximum of three buffers uses the status "input area external".

3. The method as claimed in claim 1, wherein, after allocating one of the three buffers by either the bus connection or the processing unit, the buffer is assigned the status "input area local" or "input area external".

4. The method as claimed in claim 1, wherein during a use of a buffer having the status "input area external" or "input area local" and a plurality of buffers having one of these statuses are available, the buffer which has held the status for the longest time is used.

5. The method as claimed in claim 1, wherein, when no buffer with the status "input area external" or "input area local" is available, the bus connection or the processing unit reserve a buffer with the status "input area local" or "input area external" which has held this status for the shortest time.

6. The method as claimed in claim 4, wherein, in order to identify which buffer has held a specific status for the longest time or for the shortest time for managing the maximum three buffers with the status "input area local" or "input area external", a data structure is provided configured to encode a duration of this kind by a position in the data structure.

7. The method as claimed in claim 5, wherein, in order to identify which buffer has held a specific status for the longest time or for the shortest time for managing the maximum three buffers with the status "input area local" or "input area external", a data structure is provided configured to encode a duration of this kind by a position in the data structure.

8. The method as claimed in claim 7, wherein, after allocating a buffer by either the bus connection or the processing unit, the buffer is assigned the status "input area local" or "input area external" and entered in the data structure at a last free position.

9. A non-volatile computer readable medium storing a computer program executable by a computer, the program comprising:

sending or receiving data by the module via the bus connection;

generating and processing data for transmission via the bus connection by the module using the processing unit, wherein the bus connection and the processing unit function as producer or consumer in a communication relationship established via the buffer memory;

using by each buffer one of four statutes "input area local", "local", "input area external" and "external", wherein the statuses "input area local" and "local" are used by the processing unit, and wherein the statuses "input area external" and "external" are used by the bus connection; and allocating one of the three buffers by the bus connection or the processing unit, wherein, when one of the three buffers is already allocated, the already allocated buffer is used, otherwise, one of the buffers with the status "input area external" or "input area local" is used and the status "external" or "local" is assigned.

10. The computer readable medium as claimed in claim 9, wherein exactly one buffer uses the status "local", exactly one buffer uses the status "external" and a maximum of three buffers uses the status "input area local" and a maximum of three buffers uses the status "input area external".

11. The computer readable medium as claimed in claim 9, wherein after allocating one of the three buffers by either the bus connection or the processing unit, the buffer is assigned the status "input area local" or "input area external".

12. The computer readable medium as claimed in claim 9, wherein during a use of a buffer having the status "input area external" or "input area local" and a plurality of buffers having one of these statuses are available, the buffer which has held the status for the longest time is used.

13. The computer readable medium as claimed in claim 9, wherein, when no buffer with the status "input area external" or "input area local" is available, the bus connection or the processing unit reserve a buffer with the status "input area local" or "input area external" which has held this status for the shortest time.

14. The computer readable medium as claimed in claim 12, wherein, in order to identify which buffer has held a specific status for the longest time or for the shortest time for managing the maximum three buffers with the status "input area local" or "input area external", a data structure is provided configured to encode a duration of this kind by a position in the data structure.

15. The computer readable medium as claimed in claim 13, wherein, in order to identify which buffer has held a specific status for the longest time or for the shortest time for managing the maximum three buffers with the status "input area local" or "input area external", a data structure is provided configured to encode a duration of this kind by a position in the data structure.

16. The method as claimed in claim 15, wherein, after allocating a buffer by either the bus connection or the processing unit, the buffer is assigned the status "input area local" or "input area external" and entered in the data structure at a last free position.

* * * * *